(12) United States Patent
Lai et al.

(10) Patent No.: US 11,656,497 B2
(45) Date of Patent: May 23, 2023

(54) LIGHT EMITTING MODULE AND OPTICAL LENS THEREOF

(71) Applicant: Lextar Electronics Corporation, Hsinchu (TW)

(72) Inventors: Lung-Kuan Lai, Hsinchu (TW); Ting-Kai Chen, Hsinchu (TW); Jiun-Hong Lin, Hsinchu (TW)

(73) Assignee: Lextar Electronics Corporation, Hsinchu (TW)

( * ) Notice: Subject to any disclaimer, the term of this patent is extended or adjusted under 35 U.S.C. 154(b) by 0 days.

(21) Appl. No.: 17/329,140

(22) Filed: May 25, 2021

(65) Prior Publication Data

US 2022/0382106 A1 Dec. 1, 2022

(51) Int. Cl.
*G02F 1/1335* (2006.01)
*G02F 1/13357* (2006.01)

(52) U.S. Cl.
CPC .. *G02F 1/133607* (2021.01); *G02F 1/133603* (2013.01); *G02F 1/133611* (2013.01)

(58) Field of Classification Search
CPC ......... G02F 1/133607; G02F 1/133611; G02F 1/133603; G02F 1/133616; G02F 1/133602; F21S 43/14; F21S 43/315; F21S 43/241; F21K 9/60; F21K 9/232; F21K 9/69; G02B 19/0028; G02B 3/08; G02B 19/0071; G02B 13/18
See application file for complete search history.

(56) References Cited

U.S. PATENT DOCUMENTS

| 7,554,752 | B2 | 6/2009 | Tamaoki et al. | |
| 7,798,678 | B2 | 9/2010 | Destain | |
| 2004/0027833 | A1* | 2/2004 | Amano | F21S 43/241 362/517 |
| 2004/0070855 | A1* | 4/2004 | Benitez | G02B 19/0061 359/858 |
| 2006/0083000 | A1 | 4/2006 | Yoon et al. | |
| 2006/0238881 | A1* | 10/2006 | Park | G02F 1/133603 359/642 |
| 2017/0082264 | A1* | 3/2017 | Kim | G02B 19/0014 |
| 2017/0082897 | A1* | 3/2017 | Yu | G02F 1/133606 |

FOREIGN PATENT DOCUMENTS

JP 2009152142 A * 7/2009

OTHER PUBLICATIONS

IP.com English translation of JP-2009152142-A (Year: 2009).*

* cited by examiner

*Primary Examiner* — Omar Rojas Cadima
(74) *Attorney, Agent, or Firm* — CKC & Partners Co., LLC

(57) ABSTRACT

An optical lens includes an optical transparent body which has an upper surface, a lower surface, a lateral surface and a lower concave portion. The upper surface includes a central upper concave portion, an outwardly-concave curved surface continuous from the central upper concave portion, and an inwardly-concave curved surface continuous from the outwardly-concave curved surface. The lateral surface is connected between the inwardly-concave curved surface and the lower surface. The lower concave portion is recessed from the lower surface.

20 Claims, 9 Drawing Sheets

LIGHT EMITTING MODULE AND OPTICAL LENS THEREOF

BACKGROUND

Field of Invention

The present disclosure relates to a light emitting module and its optical lens.

Description of Related Art

A light emitting diode is a light-emitting element made of semiconductor material that can convert electrical energy into light. It has the advantages of small size, high energy conversion efficiency, long lifetime, power saving, etc., so it can be widely used as light source in various electronic applications.

Multiple light emitting diodes are used in backlight module for some display panels. When the light emitting diodes are located vertically behind a display panel, e.g., a LCD panel, large amounts of light emitting diodes needs to be mounted densely in order to provide an evenly-distributed backlight, e.g., 65 inch backlight module needs 50 thousands LEDs to achieve an evenly-distributed backlight. As a result, manufacturing the backlight module costs a lot, the power consumption increases, and more heat is generated during operation, which affects a normal operation of the backlight module. How to provide an evenly-distributed backlight module with the light emitting diodes mounted less densely is desirable in the present market.

SUMMARY

One aspect of the present disclosure is to provide an optical lens including an optical transparent body. The optical transparent body has an upper surface, a lower surface, a lateral surface and a lower concave portion. The upper surface includes a central upper concave portion, an outwardly-concave curved surface continuous from the central upper concave portion, and an inwardly-concave curved surface continuous from the outwardly-concave curved surface. The lateral surface is connected between the inwardly-concave curved surface and the lower surface. The lower concave portion is recessed from the lower surface.

In one or more embodiments, the optical transparent body has a refractive index greater than 1.5.

In one or more embodiments, the upper surface is defined by a plurality of concentric circumferences arranged from the central upper concave portion to the lateral surface.

In one or more embodiments, a first concentric circumference of the plurality of concentric circumferences defines an interface between the central upper concave portion and the outwardly-concave curved surface.

In one or more embodiments, a last concentric circumference of the plurality of concentric circumferences defines an interface between the inwardly-concave curved surface and the lateral surface.

In one or more embodiments, one concentric circumference between the first and last concentric circumferences defines a recurved interface between the outwardly-concave curved surface and the inwardly-concave curved surface.

In one or more embodiments, a point of inflection connects the outwardly-concave curved surface and the inwardly-concave curved surface.

In one or more embodiments, the lower concave portion is located centrally of the lower surface and aligned with the central upper concave portion.

Another aspect of the present disclosure is to provide a light emitting module including a substrate, a light-emitting element mounted on the substrate, and the optical lens, wherein the light-emitting element is housed within the lower concave portion of the optical transparent body.

In one or more embodiments, the light emitting module further includes an optical transparent media filled within the lower concave portion of the optical transparent body.

Another aspect of the present disclosure is to provide an optical lens including an optical transparent body. The optical transparent body has an upper surface, a lower surface, a lateral surface and a lower concave portion. The upper surface includes a central upper concave portion and a curved surface continuous from the central upper concave portion. The lateral surface is connected between the curved surface and the lower surface. The lower concave portion is recessed from the lower surface, wherein the lower concave portion includes a light incident surface, and the light incident surface has a top surface and a curved sidewall surface continuous from the top surface and connecting to the lower surface, wherein a curvature of the top surface is greater than that of the curved sidewall surface.

In one or more embodiments, the top surface is a hemispherical surface.

In one or more embodiments, the lower concave portion is located centrally of the lower surface and aligned with the central upper concave portion.

In one or more embodiments, the lateral surface is substantially perpendicular to an edge of the lower surface.

In one or more embodiments, the lower concave portion is defined by a relatively small circumference and a relatively large circumference, wherein the relatively large circumference defines an interface between the curved sidewall surface and the lower surface.

In one or more embodiments, the relatively small circumference defines an interface between the top surface and the curved sidewall surface.

Still another aspect of the present disclosure is to provide a light emitting module including a substrate, a light-emitting element mounted on the substrate, and the optical lens, wherein the light-emitting element is housed within the lower concave portion of the optical transparent body.

In one or more embodiments, a first space is surrounded by the top surface and a second space is surrounded by the curved sidewall surface.

In one or more embodiments, the light emitting module further includes an optical transparent media that is filled within the second space.

In one or more embodiments, the optical transparent media has a refractive index smaller than that of the optical transparent body.

In summary, the optical lens disclosed herein include inventive designs for its upper surface and its lower concave portion, which can effectively direct light beams towards lateral directions evenly. In particular, the light emitted by the light-emitting element can be guided by the optical lens towards lateral directions by refraction and multiple reflections, allowing light to enter dark areas between the light-emitting elements, thereby improving the uniformity problem and achieving the purpose of reducing the amount of light-emitting elements. When the optical lenses covers over corresponding light-emitting elements of a light emitting module, fewer light-emitting elements are needed to construct a backlight module and optical films can be arranged close to the optical lens so as to achieve a thinner backlight module.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
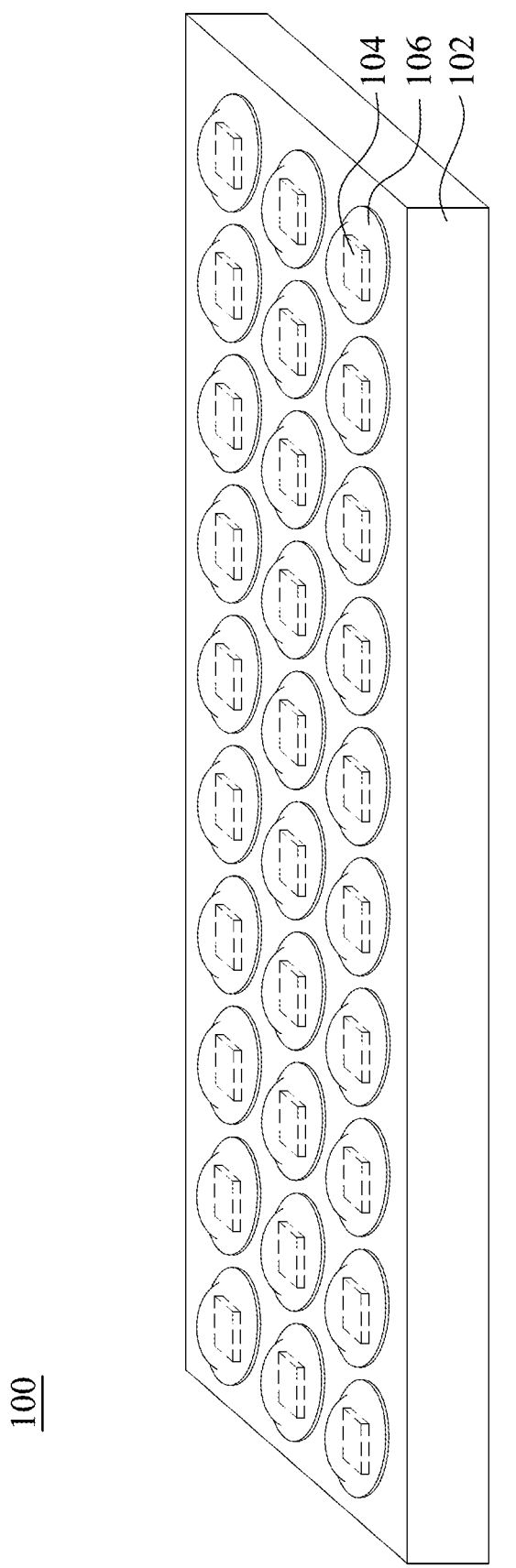
FIG. 1 illustrates a perspective view of a light emitting module in accordance with an embodiment of the present disclosure.

It is to be noted that the following descriptions of preferred embodiments of this disclosure are presented herein for purpose of illustration and description only. It is not intended to be exhaustive or to be limited to the precise form disclosed. Also, it is also important to point out that there may be other features, elements, steps and parameters for implementing the embodiments of the present disclosure which are not specifically illustrated. Thus, the specification and the drawings are to be regard as an illustrative sense rather than a restrictive sense. Various modifications and similar arrangements may be provided by the persons skilled in the art within the spirit and scope of the present disclosure. In addition, the illustrations may not necessarily be drawn to scale, and the identical elements of the embodiments are designated with the same reference numerals.

Figure 2:
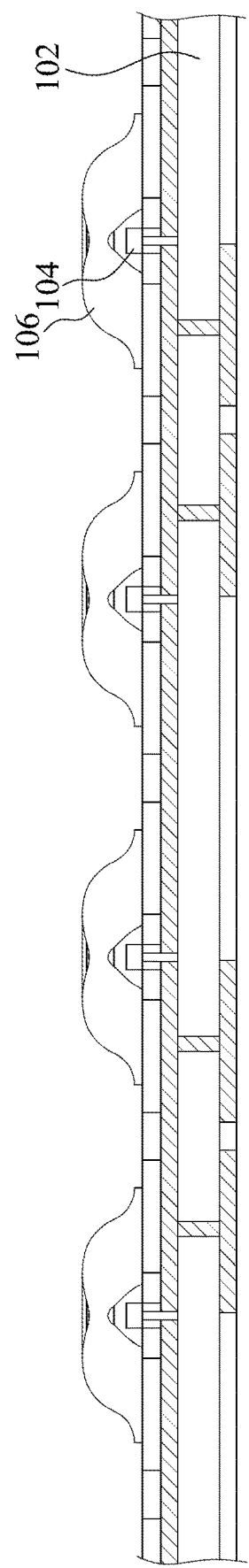
FIG. 2 illustrates a partial cross-sectional view of a light emitting module in accordance with an embodiment of the present disclosure.

Reference is made to FIGS. 1 and 2. FIG. 1 illustrates a perspective view of a light emitting module 100 in accordance with an embodiment of the present disclosure, and FIG. 2 illustrates a partial cross-sectional view of a light emitting module in accordance with an embodiment of the present disclosure. The light emitting module 100 includes a substrate 102, light emitting elements 104 and lenses 106. In one embodiment, the light emitting element 104 is a light emitting diode (LED) chip which includes an n-type semiconductor layer, an active layer and a p-type semiconductor layer stacked in an order on a sapphire substrate. In an embodiment, the p-type semiconductor layer may be a p-type GaN material, and the n-type semiconductor layer may be an n-type GaN material. In an embodiment, the p-type semiconductor layer may be a p-type AlGaN material, and the n-type semiconductor layer may be an n-type AlGaN material. The active layer has a multiple quantum well structure. The LED chips 104 maybe mounted on the substrate in a flip-chip manner. Each lens 106 is mounted to cover a corresponding LED chip 104. Each lens 106 has a lower concave portion within which a corresponding LED chip 104 is housed. Each lens 106 is configured to direct light beams from the corresponding LED chip 104 to emit evenly in lateral directions such that fewer LED chips 104 are needed on the substrate 102 to achieve a uniform light emission. In some embodiments of the present disclosure, the substrate 102 can be a printed circuit board or other types of circuit boards. In some embodiments of the present disclosure, each lens 106 has a width or diameter ranging from about 3 mm to about 15 mm. In some embodiments of the present disclosure, each lens 106 has a thickness or height ranging from about 0.5 mm to about 3 mm. In some embodiments of the present disclosure, a pitch between immediately-adjacent lenses 106 or LED chips 104 on the substrate 102 ranges from about 6 mm to about 30 mm.

Figure 3:
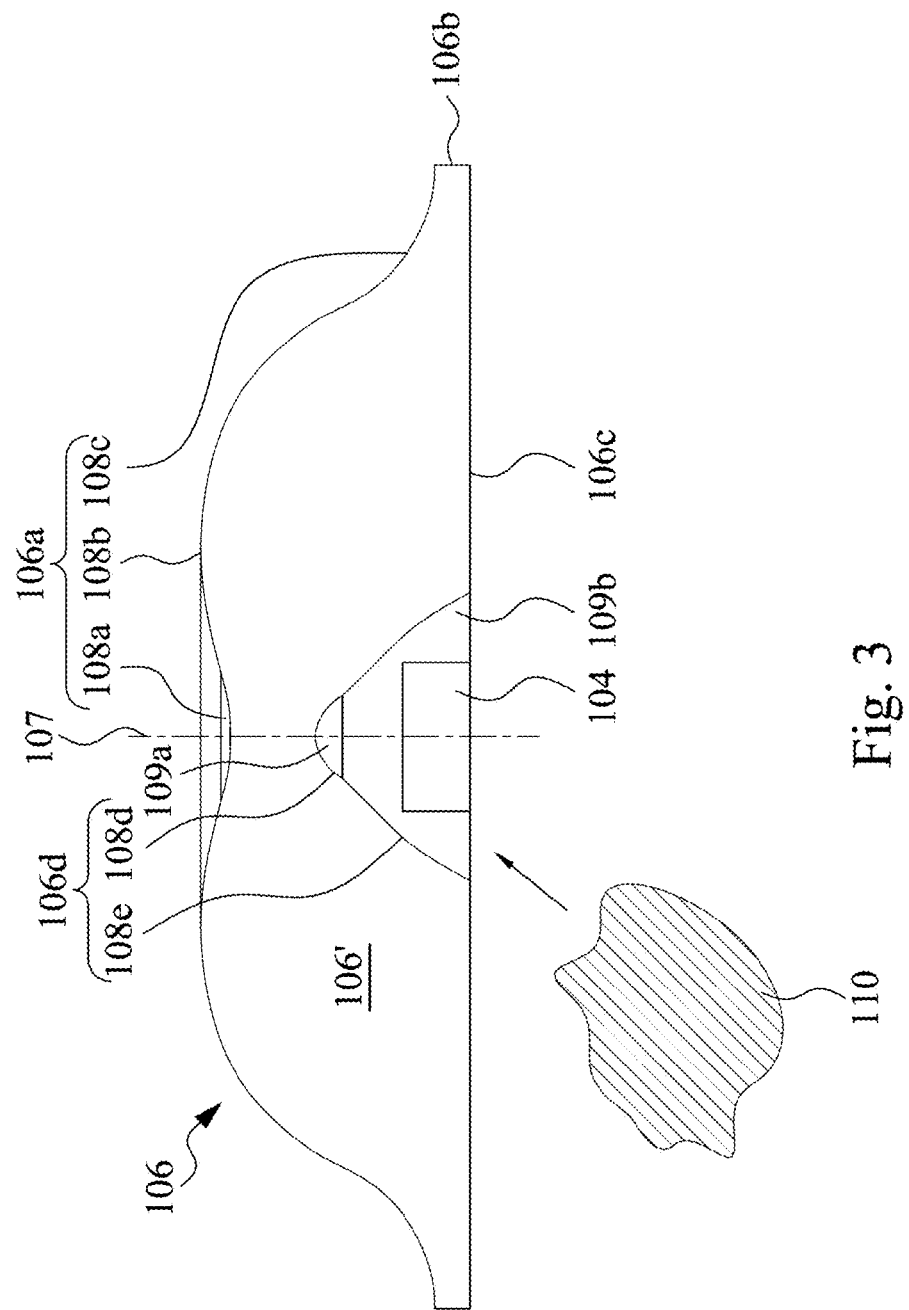
FIG. 3 illustrates a cross-sectional view of an optical lens in accordance with an embodiment of the present disclosure.

Reference is made to FIG. 3, which illustrates a cross-sectional view of an optical lens 106 in accordance with an embodiment of the present disclosure. The optical lens 106 has an optical transparent body 106' made of materials with high light transmission, high refractive index (e.g., greater than 1.5) and low light absorption. In some embodiments of the present disclosure, the optical transparent body 106' can be made from materials including poly methyl methacrylate, polycarbonate, glass, quartz, silicon, epoxy or any combinations thereof. The optical transparent body 106' has an upper surface 106a, a lower surface 106c, a lateral surface 106b and a lower concave portion 106d which are all circularly symmetric with respect to a central axis 107. The upper surface 106a includes a central upper concave portion 108a, an outwardly-concave curved surface 108b continuous from the central upper concave portion 108a, and an inwardly-concave curved surface 108c continuous from the outwardly-concave curved surface 108b. The lateral surface 106b is connected between the inwardly-concave curved surface 108c and the lower surface 106c. The lower concave portion 106d is recessed from a central part of the lower surface 106c.

In some embodiments of the present disclosure, the lower concave portion 106d is located centrally of the lower surface 106c and aligned with the central upper concave portion 108a. In some embodiments of the present disclosure, the lower concave portion 106d and the central upper concave portion 108a are both circularly symmetric with respect to the central axis 107. In some embodiments of the present disclosure, the lower concave portion 106d and the central upper concave portion 108a are concave towards each other, so as to guide more concentrated light in the vertical direction towards lateral directions, thereby making the light distribution more uniform.

In some embodiments of the present disclosure, the lower surface 106c and the lateral surface 106b are substantially flat surfaces. In some embodiments of the present disclosure, the lateral surface 106b is substantially perpendicular to an outer edge of the lower surface 106c.

The lower concave portion 106d includes an inner surface as a light incident surface for a corresponding LED chip 104 housed inside. The light incident surface has a top surface 108d and a curved sidewall surface 108e continuous from the top surface 108d and connecting to the lower surface 106c. In some embodiments of the present disclosure, a curvature of the top surface 108d is greater than that of the curved sidewall surface 108e in order to reduce incident light beams in the positive vertical direction and increase incident light beams in the lateral directions such that the light distribution changes at the incident end, which is beneficial to the subsequent control of the corresponding light deflection. In some embodiments of the present disclosure, the top surface 108d is a hemispherical surface.

A hollow chamber or space 109a is surrounded and defined by the top surface 108d, and a hollow chamber or space 109b (under the space 109a) is surrounded and defined by the curved sidewall surface 108e. In some embodiments of the present disclosure, an optical transparent media 110 may be filled within the space 109b to cover or seal the LED chip 104, wherein the space 109a is empty and not filled with the optical transparent media 110. In some embodiments of the present disclosure, an optical transparent media 110 may be filled both within the space 109a and the space 109b to cover or seal the LED chip 104. In some embodiments of the present disclosure, no optical transparent media is filled within the space 109b or the space 109a, e.g., only air is filled within the spaces (109a, 109b). In some embodiments of the present disclosure, the optical transparent media 110 may have a refractive index smaller than that of the optical transparent body 106' to enhance light output rate. In some embodiments of the present disclosure, the optical transparent media 110 may be an optically clear adhesive with a refractive index greater than 1.5 and smaller than that of the optical transparent body 106'.

Figure 4:
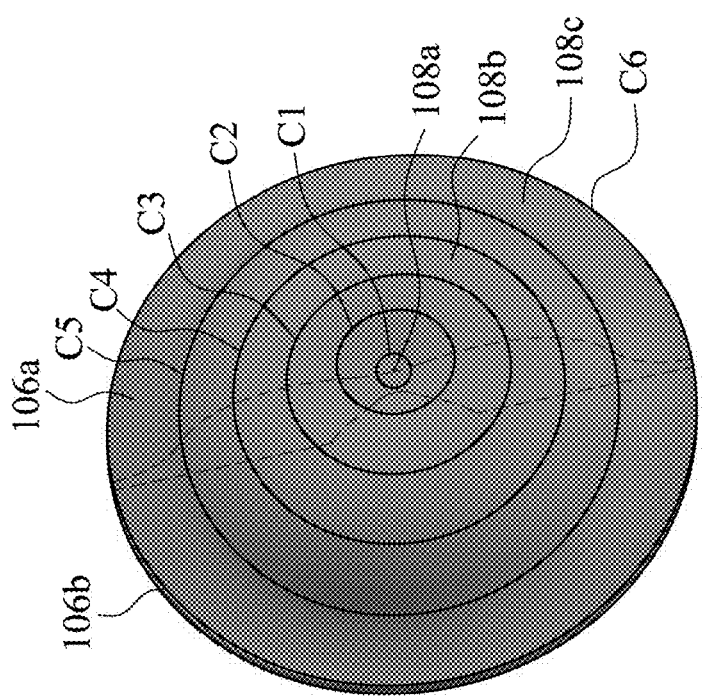
FIG. 4 illustrates a perspective view of an optical lens with concentric circumferences in accordance with an embodiment of the present disclosure.

Reference is made to FIG. 4, which illustrates a perspective view of an optical lens 106 with concentric circumferences in accordance with an embodiment of the present disclosure. In some embodiments of the present disclosure, the upper surface 106a of the optical lens 106 may be defined by a plurality of concentric circumferences (C1-C6) with different diameters. In some embodiments of the present disclosure, the concentric circumference (C1) defines an interface between the central upper concave portion 108a and the outwardly-concave curved surface 108b. In some embodiments of the present disclosure, the concentric circumference (C6) defines an interface between the inwardly-concave curved surface 108c and the lateral surface 106b. In some embodiments of the present disclosure, the concentric circumference (C5) defines a recurved interface (referring to FIG. 7) between the outwardly-concave curved surface 108b and the inwardly-concave curved surface 108c.

Figure 5:
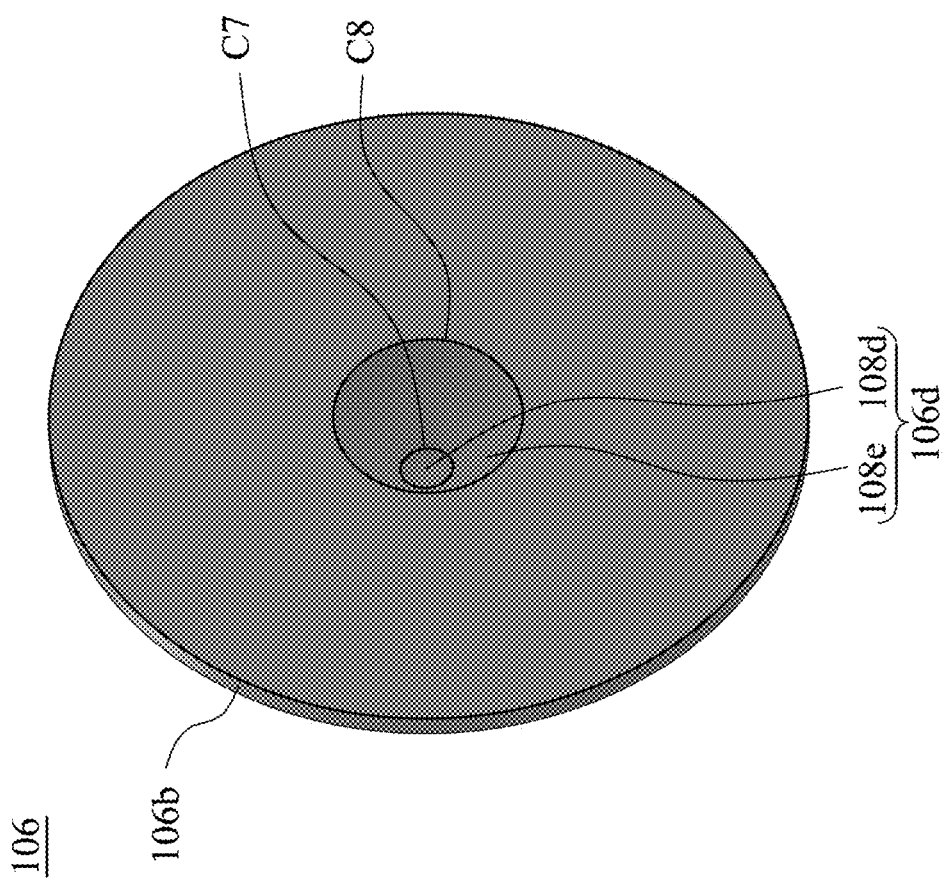
FIG. 5 illustrates another perspective view of an optical lens with concentric circumferences in accordance with an embodiment of the present disclosure.

Reference is made to FIG. 5, which illustrates another perspective (bottom) view of an optical lens 106 with concentric circumferences in accordance with an embodiment of the present disclosure. In some embodiments of the present disclosure, the lower concave portion 106d of the optical lens 106 is defined by a relatively small circumference (C7) and a relatively large circumference (C8). In some embodiments of the present disclosure, the relatively large circumference (C8) defines an interface between the curved sidewall surface 108e and the lower surface 106c. In some embodiments of the present disclosure, the relatively small circumference (C7) defines an interface between the top surface 108d and the curved sidewall surface 108e. In some embodiments of the present disclosure, the top surface 108d is a hemispherical surface.

Figure 6:
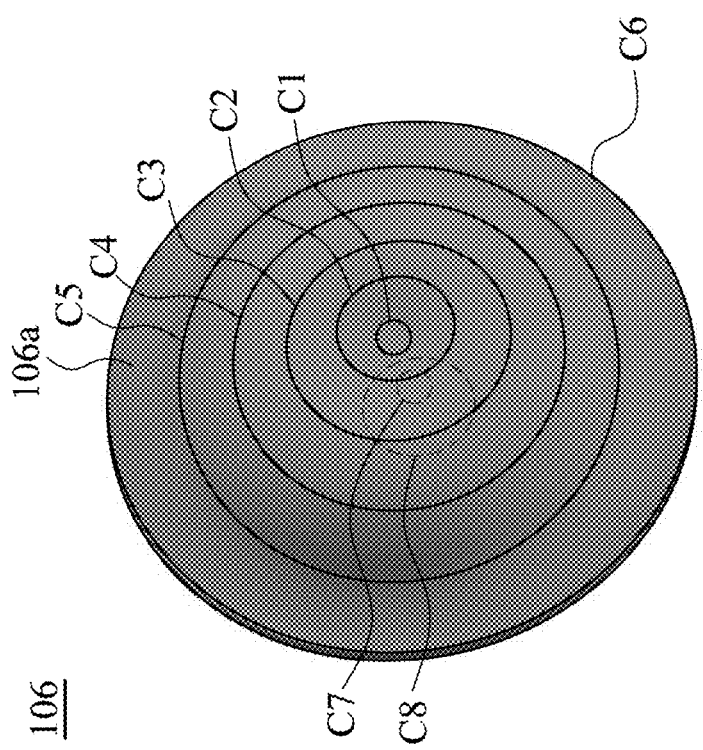
FIG. 6 illustrates still another perspective view of an optical lens with concentric circumferences in accordance with an embodiment of the present disclosure.
Figure 7:
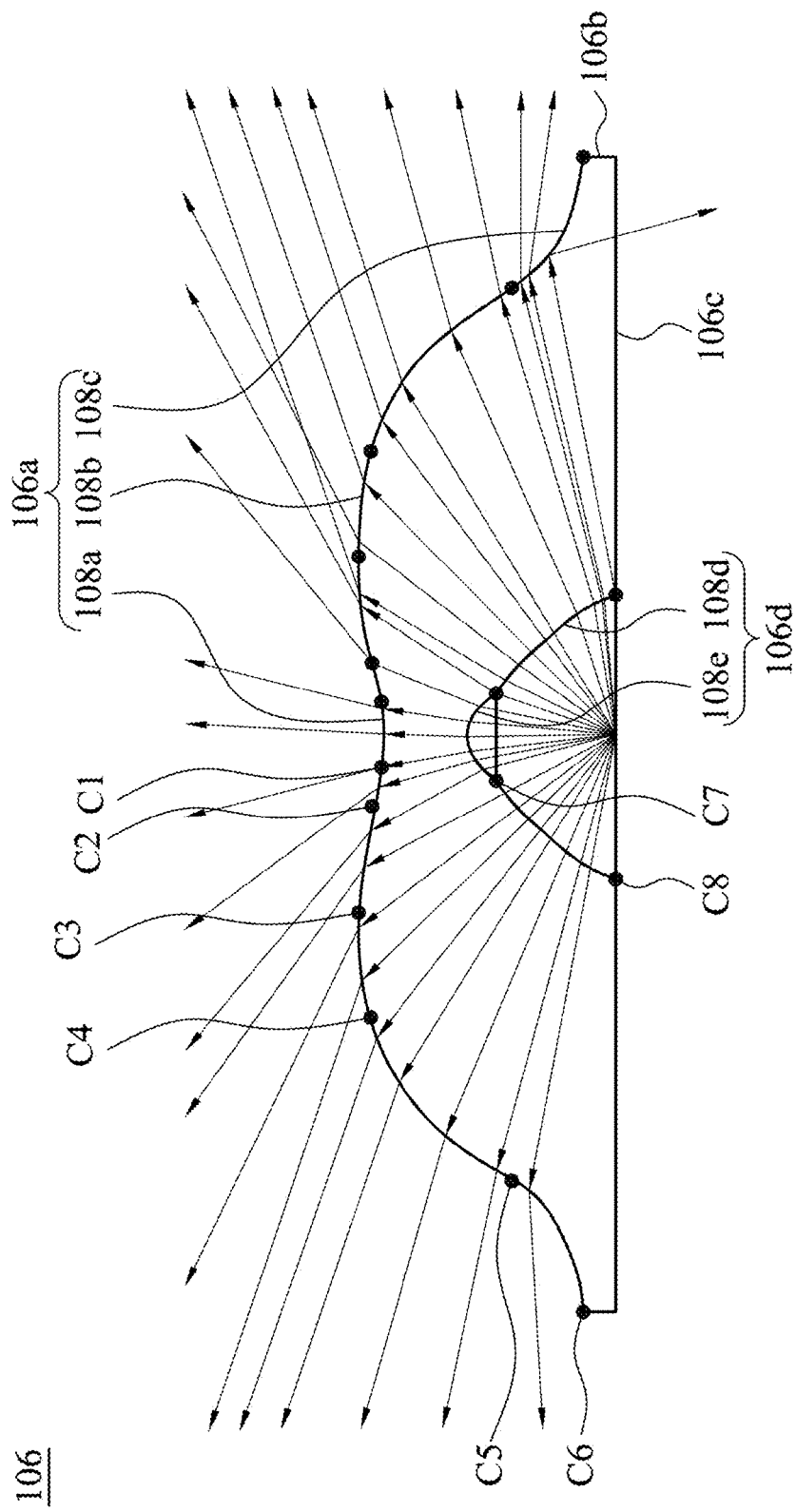
FIG. 7 illustrates a cross-sectional view of an optical lens with concentric circumferences and simulated light beams in accordance with an embodiment of the present disclosure.

Reference is made to FIGS. 6 and 7. FIG. 6 illustrates still another perspective view of an optical lens 106 with concentric circumferences in accordance with an embodiment of the present disclosure, and FIG. 7 illustrates a cross-sectional view of an optical lens with concentric circumferences and simulated light beams in accordance with an embodiment of the present disclosure. The relatively small circumference (C7) and the relatively large circumference (C8) in the lower surface of the optical lens 106 are also concentric with those concentric circumferences (C1-C6) in the upper surface of the optical lens 106, i.e., the circumferences (C1-C8) are concentric with respect to the central axis 107 (referring to FIG. 3). In some embodiments of the present disclosure, the concentric circumference (C1) defines an interface between the central upper concave portion 108a and the outwardly-concave curved surface 108b which is located between the concentric circumference (C1) and the concentric circumference (C5). In some embodiments of the present disclosure, the concentric circumference (C6) defines an interface between the lateral surface 106b and the inwardly-concave curved surface 108c which is located between the concentric circumference (C5) and the concentric circumference (C6). In some embodiments of the present disclosure, the concentric circumference (C5) defines a recurved interface between the outwardly-concave curved surface 108b and the inwardly-concave curved surface 108c. In some embodiments of the present disclosure, a point of inflection, e.g., the concentric circumference (C5), is connected between the outwardly-concave curved surface 108b and the inwardly-concave curved surface 108c. Light beams emitted from the LED chip 104 is directed into the optical lens 106 via the light incident surface, e.g., the top surface 108d and the curved sidewall surface 108e of the lower concave portion 106d, and directed out of the optical lens 106 via the upper surface 106a, e.g., the central upper concave portion 108a, the outwardly-concave curved surface 108b and the inwardly-concave curved surface 108c. The designs for the light incident surface and the light emitting surface of the optical lens can effectively direct light beams towards lateral directions uniformly. For example (referring to FIG. 7), light beams emitted out from the inwardly-concave curved surface 108c (located between the concentric circumference C5 and the concentric circumference C6) can be directed downwards such that light beams towards lateral directions can be evenly-distributed.

Figure 8:
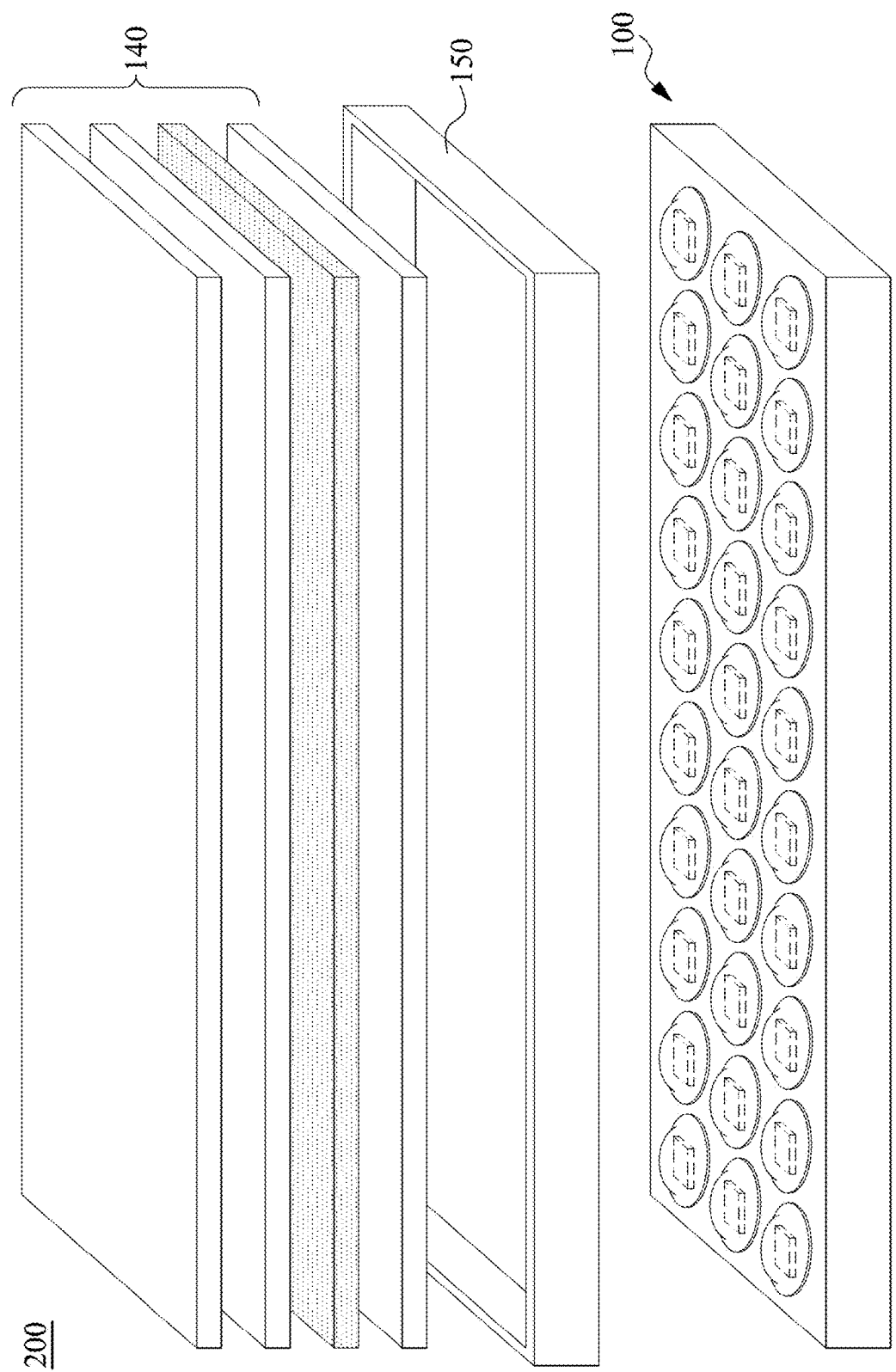
FIG. 8 illustrates a display comparison of a light emitting module with two different configurations in accordance with an embodiment of the present disclosure.

Reference is made to FIG. 8, which illustrates a perspective view of a backlight module 200 in accordance with an embodiment of the present disclosure. The backlight module 200 includes a light emitting module 100, a frame 150 and a plurality of optical films 140. The frame 150 is mounted around the light emitting module 100 and configured to accommodate the optical films 140 over a top surface of the light emitting module 100. In some embodiments of the present disclosure, the optical films 140 may include a filter film, a polarizing film, a light diffusion film, etc. In some embodiments of the present disclosure, the optical films 140 may further include a wavelength conversion film, which comprises phosphor material and/or quantum dots. The backlight module is for emitting white light. To achieve white light, the LED chips 104 may emit blue light and the wavelength conversion film may include yellow phosphor (such as YAG:Ce). For instance, the LED chips 104 may emit blue light and the wavelength conversion film may include red and green wavelength conversion material. Red wavelength conversion material maybe red phosphors or red QDs. Green wavelength conversion material maybe green phosphors or green QDs. For instance, the red phosphor may include $A_2[MF_6]:Mn^{4+}$, wherein A is selected from the group consisting of Li, Na, K, Rb, Cs, $NH_4$ and a combination thereof, M is selected from the group consisting of Ge, Si, Sn, Ti, Zr and a combination thereof. Optionally, the red phosphor may include (Ca, Sr)$_2$Si$_5$N$_8$:Eu, CaAlSiN$_3$:Eu, etc. Red QDs may include CdSe, QDs or red all-inorganic perovskite QDs. For instance, the green phosphor may include β-SiAlON:Eu$^{2+}$. Green QDs may include green all-inorganic perovskite QDs.

Figure 9:
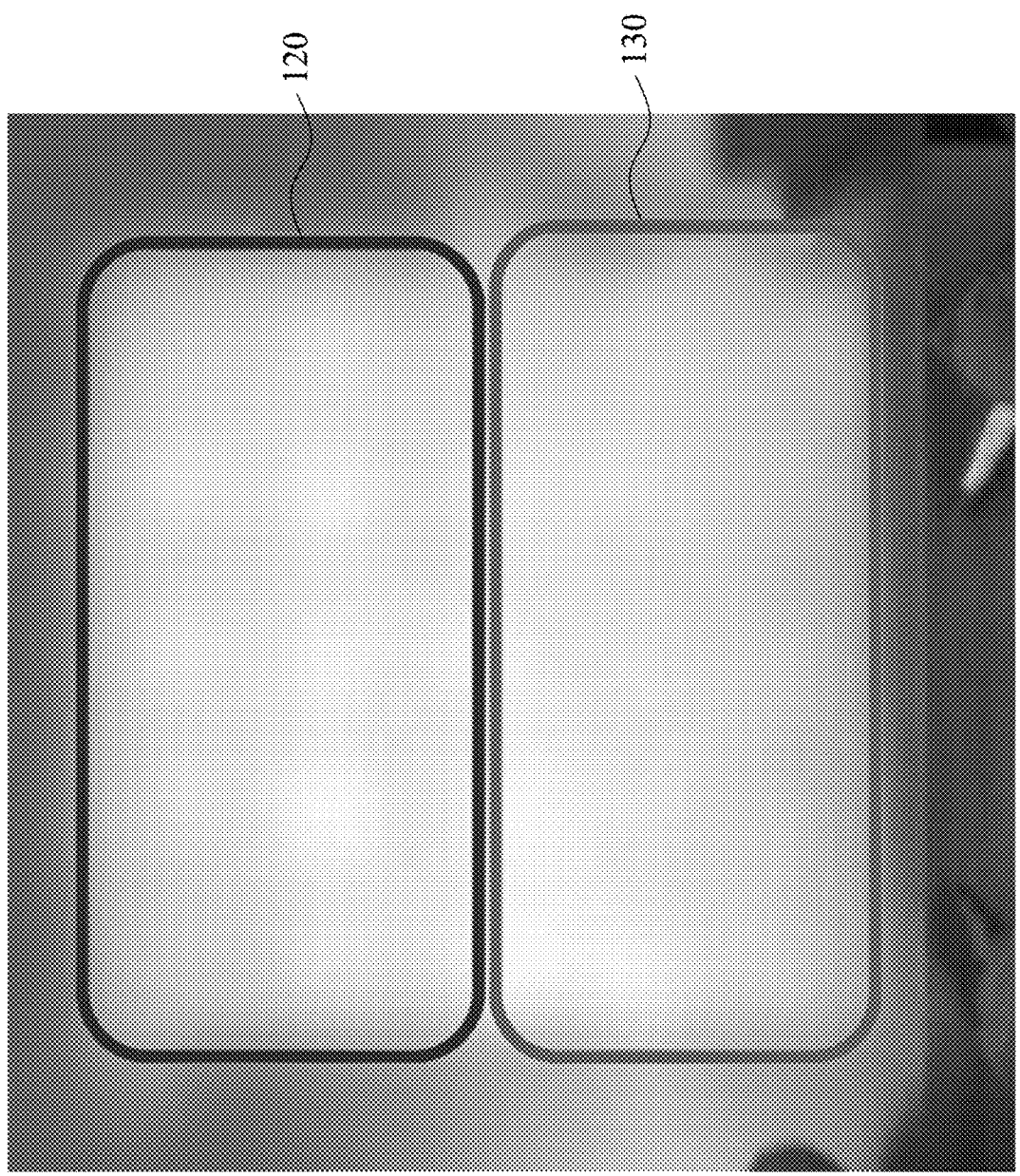
FIG. 9 illustrates a perspective view of a backlight module in accordance with an embodiment of the present disclosure.

Reference is made to FIG. 9, which illustrates a display comparison of a backlight module with two different configurations in accordance with an embodiment of the present disclosure. A display image 120 (within a blue loop in FIG. 9) is generated by a backlight module 200 having the lenses 106 to cover corresponding LED chips 104, wherein the lenses 106 has its spaces (109a, 109b) without optical transparent media filled within. Another display image 130 (within a red loop in FIG. 9) is generated by a backlight module 200 having the lenses 106 to cover corresponding LED chips 104, wherein the lenses 106 has its space 109b filled with the optical transparent media 110 (referring to FIG. 3) and its space 109a without optical transparent media filled within. The display image 130 has a more even light distribution than the display image 120 has.

In summary, the optical lens disclosed herein include inventive designs for its upper surface and its lower concave portion, which can effectively direct light beams towards lateral directions evenly. In particular, the light emitted by the LED chips can be guided by the optical lens towards lateral directions by refraction and multiple reflections, allowing light to enter dark areas between the LED chips, thereby improving the uniformity problem and achieving the purpose of reducing the amount of LED chips. When the optical lens is covered over a corresponding LED chip of a light emitting module, fewer or less densely located LED chips are needed to construct a backlight module and optical films can be arranged close to the optical lens so as to achieve a thinner backlight module.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An optical lens comprising:
   an optical transparent body comprising:
   an upper surface comprising a central upper concave portion, an outwardly-convex curved surface continuous from the central upper concave portion, and an inwardly-concave curved surface continuous from the outwardly-convex curved surface;
   a lower surface;
   a lateral surface connected between the inwardly-concave curved surface and the lower surface, wherein a first interface between the inwardly-concave curved surface and the lateral surface is closer to the lower surface than a curved interface between the outwardly-convex curved surface and the inwardly-concave curved surface, wherein the inwardly-concave curved surface is configured to refract light beams downwards; and
   a lower concave portion recessed from the lower surface.

2. The optical lens of claim 1, wherein the optical transparent body comprises a refractive index greater than 1.5.

3. The optical lens of claim 1, wherein the upper surface is defined by a plurality of concentric circumferences disposed from the central upper concave portion to the lateral surface.

4. The optical lens of claim 3, wherein a first concentric circumference of the plurality of concentric circumferences defines a second interface between the central upper concave portion and the outwardly-convex curved surface.

5. The optical lens of claim 4, wherein a last concentric circumference of the plurality of concentric circumferences defines the first interface between the inwardly-concave curved surface and the lateral surface.

6. The optical lens of claim 5, wherein one concentric circumference between the first and last concentric circumferences defines the curved interface between the outwardly-convex curved surface and the inwardly-concave curved surface.

7. The optical lens of claim 1, wherein a point of inflection connects the outwardly-convex curved surface and the inwardly-concave curved surface.

8. The optical lens of claim 1, wherein the lower concave portion is disposed centrally of the lower surface and aligned with the central upper concave portion.

9. A light emitting module comprising:
   a substrate;
   a light-emitting element disposed on the substrate; and
   the optical lens of claim 1, wherein the light-emitting element is housed within the lower concave portion of the optical transparent body.

10. The light emitting module of claim 9 further comprising an optical transparent media filled within the lower concave portion of the optical transparent body.

11. An optical lens comprising:
    an optical transparent body comprising:
    an upper surface comprising a central upper concave portion and a curved surface continuous from the central upper concave portion, wherein the curved surface comprises an outwardly-convex curved surface continuous from the central upper concave portion, and an inwardly-concave curved surface continuous from the outwardly-convex curved surface;
    a lower surface;
    a lateral surface connected between the curved surface and the lower surface;
    a lower concave portion recessed from the lower surface, wherein the lower concave portion comprises a light incident surface, and the light incident surface has a top surface and a curved sidewall surface continuous from the top surface and connecting to the lower surface, wherein a curvature of the top surface is greater than that of the curved sidewall surface, the top surface surrounds and defines a first hollow space, and the curved sidewall surface surrounds and defines a second hollow space, wherein the inwardly-concave curved surface is configured to refract light beams from the light incident surface downwards; and
    an optical transparent media filled within the second hollow space and not filled within the first hollow space.

12. The optical lens of claim 11, wherein the top surface is a hemispherical surface.

13. The optical lens of claim 11, wherein the lower concave portion is disposed centrally of the lower surface and aligned with the central upper concave portion.

14. The optical lens of claim 11, wherein the lateral surface is substantially perpendicular to an edge of the lower surface.

15. The optical lens of claim 11, wherein the lower concave portion is defined by a relatively small circumference and a relatively large circumference, wherein the relatively large circumference defines an interface between the curved sidewall surface and the lower surface.

16. The optical lens of claim 15, wherein the relatively small circumference defines an interface between the top surface and the curved sidewall surface.

17. A light emitting module comprising:
a substrate;
a light-emitting element disposed on the substrate; and
the optical lens of claim 11, wherein the light-emitting element is housed within the lower concave portion of the optical transparent body.

18. The light emitting module of claim 17, wherein the optical transparent media comprises a refractive index smaller than that of the optical transparent body.

19. A light emitting module comprising:
a substrate;
a plurality of light-emitting diode chips disposed on the substrate in a flip-chip manner; and
a plurality of optical lenses respectively over the light-emitting diode chips and disposed in contact with the substrate, the optical lenses each having an optical transparent body comprising:
an upper surface comprising a central upper concave portion, an outwardly-convex curved surface continuous from the central upper concave portion, and an inwardly-concave curved surface continuous from the outwardly-convex curved surface;
a lower surface;
a lateral surface connected between the inwardly-concave curved surface and the lower surface, wherein a first interface between the inwardly-concave curved surface and the lateral surface is closer to the lower surface than a curved interface between the outwardly-convex curved surface and the inwardly-concave curved surface; and
a lower concave portion recessed from the lower surface, wherein a corresponding one of the light-emitting diode chips is housed within the lower concave portion of the optical transparent body.

20. The light emitting module of claim 19, wherein the lower concave portion comprises a light incident surface, and the light incident surface has a top surface and a curved sidewall surface extending downwards from a bottom of the top surface to a bottom of the curved sidewall surface, the curved sidewall surface is continuously curved from a top to the bottom of the curved sidewall surface, the lower surface extends laterally from the bottom of the curved sidewall surface to a bottom of the lateral surface, and an entirety of the lower surface is flat.

* * * * *